United States Patent [19]

Aschwanden

[11] 4,335,412
[45] Jun. 15, 1982

[54] TRIAX SAFETY CIRCUIT

[75] Inventor: Felix Aschwanden, Thawil, Switzerland

[73] Assignee: RCA Corporation, Princeton, N.J.

[21] Appl. No.: 234,541

[22] Filed: Feb. 13, 1981

[30] Foreign Application Priority Data

Sep. 12, 1980 [GB] United Kingdom ................ 8029527

[51] Int. Cl.³ .............................................. H02H 3/16
[52] U.S. Cl. ....................................... 361/50; 361/42; 340/650; 340/652; 340/649
[58] Field of Search ....................... 361/50, 49, 48, 47, 361/42, 58, 93, 92; 307/649, 650, 651, 652

[56] References Cited

U.S. PATENT DOCUMENTS 3,072,827  1/1963  Benish .................................. 361/49
3,766,434 10/1973  Sherman ............................... 361/50
3,961,319  6/1976  Asberry ............................ 361/50 X Primary Examiner—Patrick R. Salce
Attorney, Agent, or Firm—Paul J. Rasmussen; William H. Meise; Henry I. Steckler

[57] ABSTRACT

A safety circuit prevents shocks, and is particularly useful with a television camera head and processing unit that are connected by a triaxial cable. The circuit applies power to the triax at the processing unit. If the current is interrupted, the power is no longer applied and a selected impedance is applied to the triax at the camera. If said impedance can be detected at the processing unit, power is reapplied to the triax. The impedance can comprise a diode, which has different effects upon different alternating signal polarities.

11 Claims, 13 Drawing Figures

TRIAX SAFETY CIRCUIT

BACKGROUND OF THE INVENTION

The present invention relates to safety circuits, and more particularly, to safety circuits for use with remotely controlled television cameras.

As shown in FIG. 1, it is frequently desirable in certain situations, e.g. sporting, or political events, to have a television camera head (CH) 10 at a considerable distance (sometimes up to 2 miles) from a camera processor and control unit (CPU) 12. An interconnecting transmission line 14 is used in order to both power (280 volts AC is typical) and control the CH from the CPU. Further line 14 provides audio and video channels. One type of line that is used for these purposes has 81 conductors. This is expensive, inconvenient to handle, and thick. In the RCA TK-47 camera, time-division multiplexing is used in order to reduce the required number of conductors to 30. This reduces cost and bulk as compared to the 81 conductor cable. To maximize safety, both the 30- and 81-conductor cables use screw-on connectors, with the "hot" side (the side of the cable having the power) having a female connector. As a further safety measure in the 30 conductor cable, one conductor, called a "sense wire" is connected to ground at CH 10. If the cable is broken or disconnected, a "high" logic voltage level is applied to this wire, which high logic level actuates a logic circuit to trip a relay in CPU 12. The tripped relay causes power to be no longer applied to the cable 14.

Recently, to still further reduce the bulk and cost of the cable, triaxial ("Triax") cable 15, as shown in FIG. 3, has been used. This cable 15 comprises an inner conductor 16, insulation layer 18, inner shield 20, insulation layer 22, outer shield 24, and finally an outer insulation layer 26. The outer shield 24 is connected to the casing of the CPU 12 and CH 10. The AC power and signals are all transmitted using inner shield 20 and inner conductor 16 using triax interface circuits 28 and 30 shown in FIG. 2. Circuits 28 and 30 are shown in more detail in FIG. 4. In this arrangement, signals at CPU 12 are frequency division multiplexed by filters (not shown) and applied to an RF (radio frequency) modulator 32. The resulting modulated signal is applied to LPF (low pass filter) 34, and the resulting filtered signal is applied to capacitor C1. Capacitor C1 has a high voltage rating and a low reactance for RF signals, and therefore serves to block the AC power from entering the RF circuits as explained below. Thus the filtered signal is applied to inner conductor 16. Also applied to conductor 16, as well as inner shield 20 is AC power from a source (not shown) through isolation inductors L1 and L2. These inductors block the RF signals from the AC power source while letting AC power pass through them. Triax 15 conveys the AC and RF signals to CH 10 where they are applied to blocking capacitor C3 and isolation inductors L3 and L4. It is noted that isolation capacitors C2 and C4 are coupled to inner shield 12 and the RF source ground at CPU 12 and CH 10 respectively. At CH 10, the RF signals pass through blocking capacitor C3 and are applied to LPF 36 and HPF (high pass filter) 38. However, since the RF signals were passed through LPF 34, they will only pass through LPF 36 and not HPF 38. From LPF 36 the RF signals are applied to a demodulator (not shown) and then baseband filters (not shown) to separate them. Further, the RF signals cannot pass through isolation inductors L3 and L4. The AC power cannot pass through capacitor C3, but it does pass through inductors L3 and L4 to power the rest of CH 10 (not shown).

At CH 10 RF signals from a high frequency modulator (not shown) are applied to HPF 38 and then pass through capacitor C3. The RF signals cannot pass through LPF 36 or inductors L3 and L4, and thus substantially all of the RF signals are applied between inner conductor 16 and inner shield 20. Triax 15 conveys the RF signals to CPU 12 where they pass through capacitor C1 and then HPF 40 to synchronous demodulator 42. The high frequency RF signals from CH 10 cannot pass through inductors L1 and L2 or LPF 34. From demodulator 42 the now demodulated signals are applied to baseband filters (not shown) for their separation.

It will be seen that no sense wire (as explained above) is present in the triax system of FIG. 4.

It is therefore desirable to improve the safety of a triaxial cable system.

SUMMARY OF THE INVENTION

Method and apparatus comprises applying a current to a transmission line, sensing if said current is interrupted, and ceasing the application of said current to said line upon sensing that said current has been interrupted.

DESCRIPTION OF THE INVENTION

Figure 1:
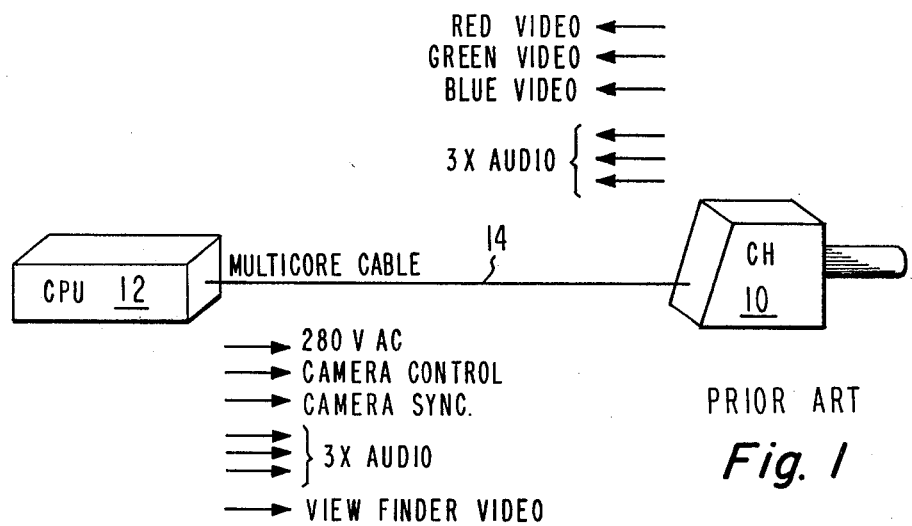
FIGS. 1 and 2 are block diagrams showing a typical prior art camera and control unit using multi-conductor and triaxial cable respectively.
Figure 2:
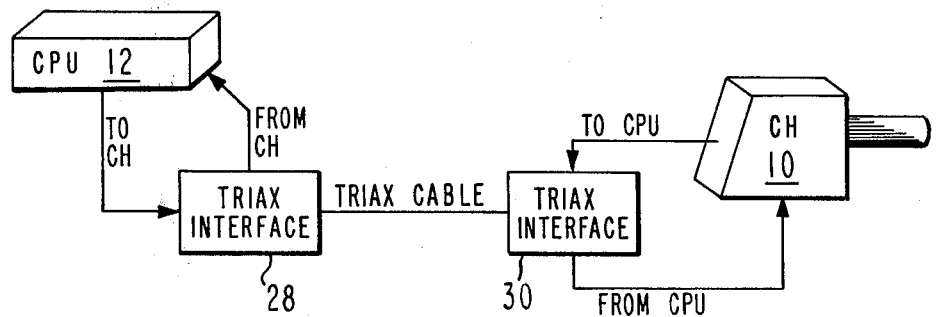
Figure 3:
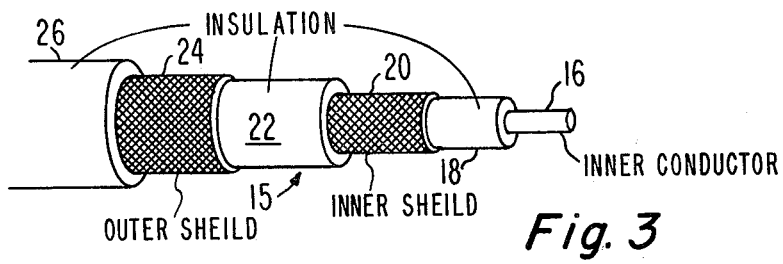
FIG. 3 shows triaxial cable.
Figure 4:
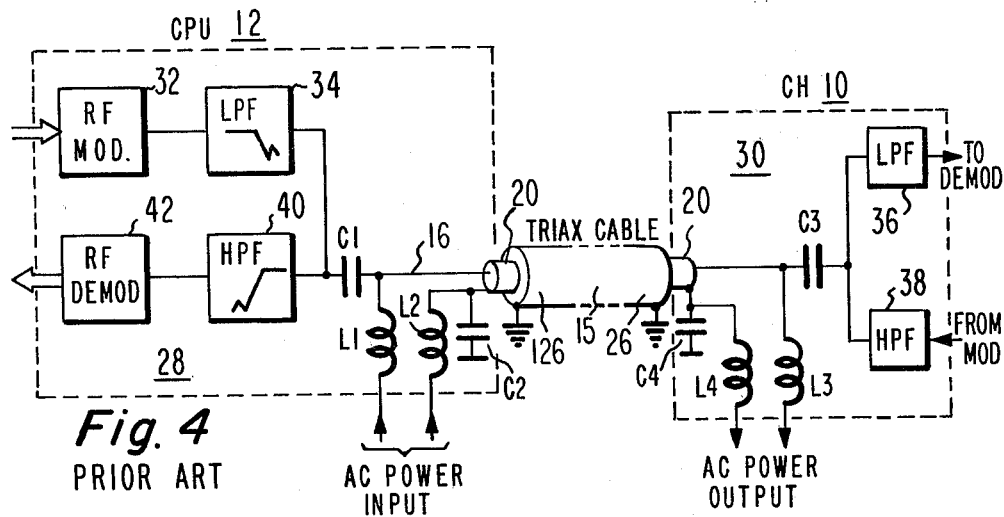
FIG. 4 is a partly block and partly schematic drawing of details of FIG. 2.
Figure 5:
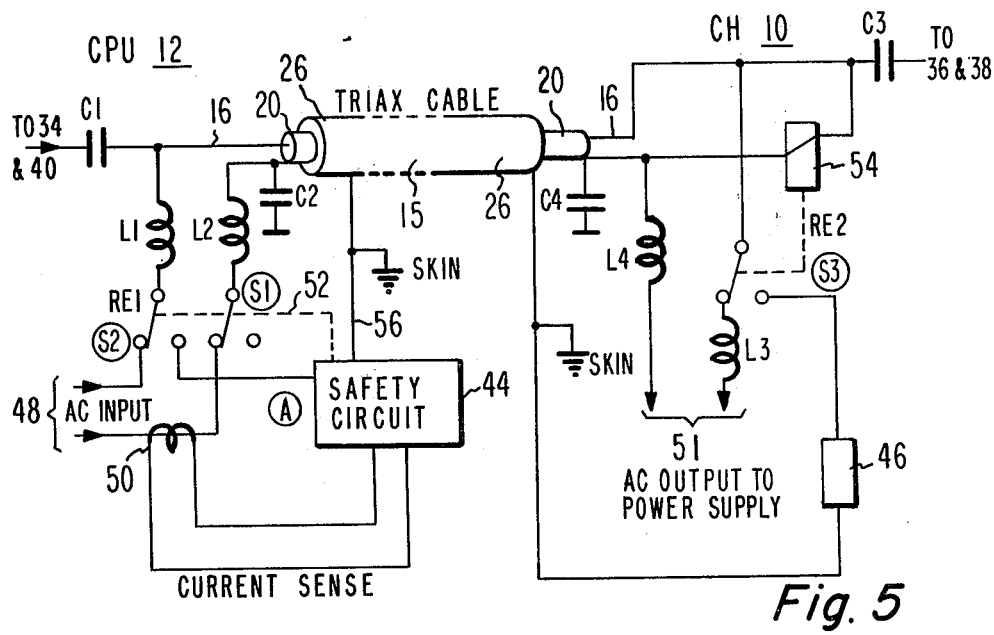
FIG. 5 is a partly block and partly schematic drawing of a safety circuit in accordance with the invention.

FIG. 5 shows a modification of FIG. 4 that incorporates a safety circuit 44 in accordance with the present invention. Also added are relays RE1 and RE2 at CPU 12 and CH 10, respectively as well as a combination of passive elements 46 at CH 10.

When the relays RE1 and RE2 are in the positions shown in FIG. 5, the AC path is from AC input 48 at CPU 12 through relay RE1, inner conductor 16 and inner shield 20, relay RE2, to AC output 51. Thus the AC path is closed (conducting). A current sense coil 50 is inductively coupled to one of the lines connected to AC input 48 and applies the resulting induced voltage to safety circuit 44. Circuit 44 applies a signal on control output line 52 to the relay coil (not shown) of relay RE1 so as to maintain the relay contacts S1 and S2 in the position shown in FIG. 5. Coil 54 of relay RE2 is powered directly from inner conductor 16 and inner shield 20 and maintains the relay RE2 in the position shown.

If for any reason the AC path is interrupted, e.g., by disconnecting triax cable 15 at either end, the AC current will no longer flow, and therefore no induced voltage will be applied by sense coil 50 to safety circuit 44. A lack of voltage on line 52 then causes the relay contacts S1 and S2 to switch over to the opposite position from that shown in FIG. 5, thereby interrupting the application of AC power to triax 15. Since AC power is no longer being applied to coil 54 of relay RE2, contacts S3 switch over to the position opposite to that shown in FIG. 5, thereby disconnecting AC output 51 from inner conductor 16. The upper end of combination 46 is now connected to inner conductor 16. The other (lower) end of combination 46 is permanently connected to outer shield 26.

Due to the above-described switching over of relay RE1, output A of safety circuit 44 is now connected via contacts S2 of relay RE1 to inner conductor 16 of triax 15. If triax 15 is connected again, the outputs A and 56 of safety circuit 44 can "see" combination 46 via contacts S2, inner conductor 16 and outer shield 26 of triax 15, and contacts S3. Circuit 44 then generates a pulse to switch over relay RE1. This connects the AC power to triax 15. If the outputs A and 56 cannot "see" the combination 44 because the cable is unplugged, short-circuited, or touched by a human finger, no pulse will be generated and the AC power will never be connected to triax 15. The application of the AC power causes contacts S3 to switch over since coil 54 of relay RE2 is powered via the triax 15. The switching over of contacts S3 connects the AC power to the CH 10 power supply (not shown) that is connected to output 51. The current sense coil 50 in CPU 12 then causes a continuous current to be applied to the coil of relay RE1 to continuously maintain contacts S1 and S2 in the position shown in FIG. 5.

Figure 6:
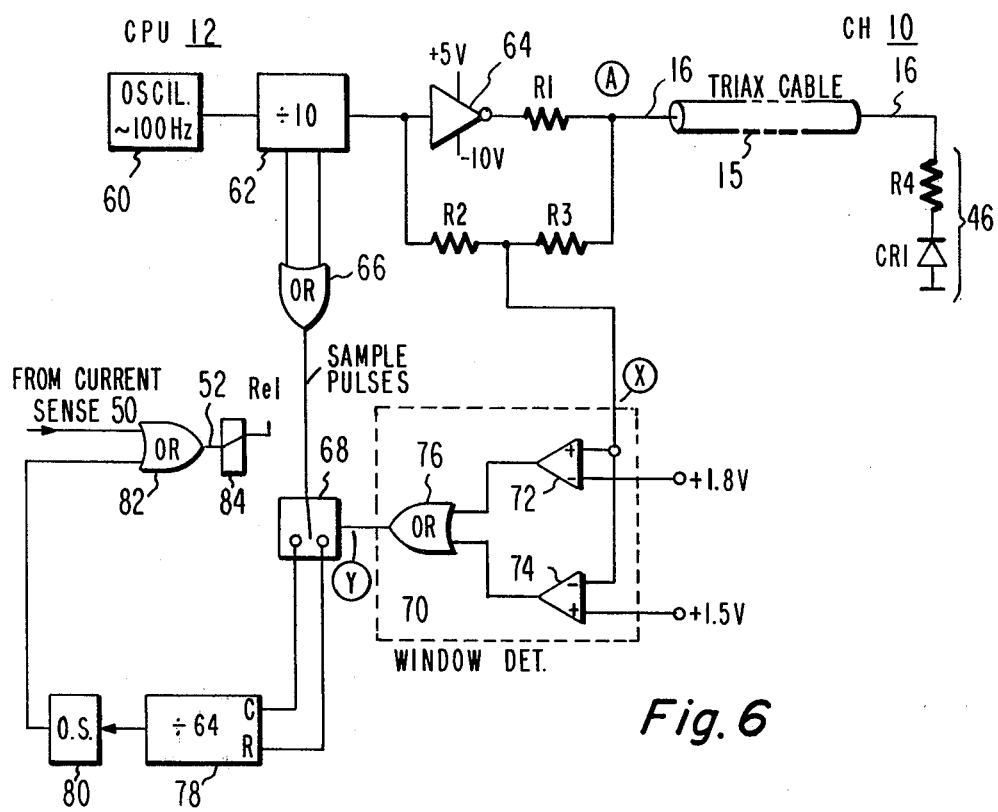
FIG. 6 is a schematic diagram of details of FIG. 5.
Figure 7:
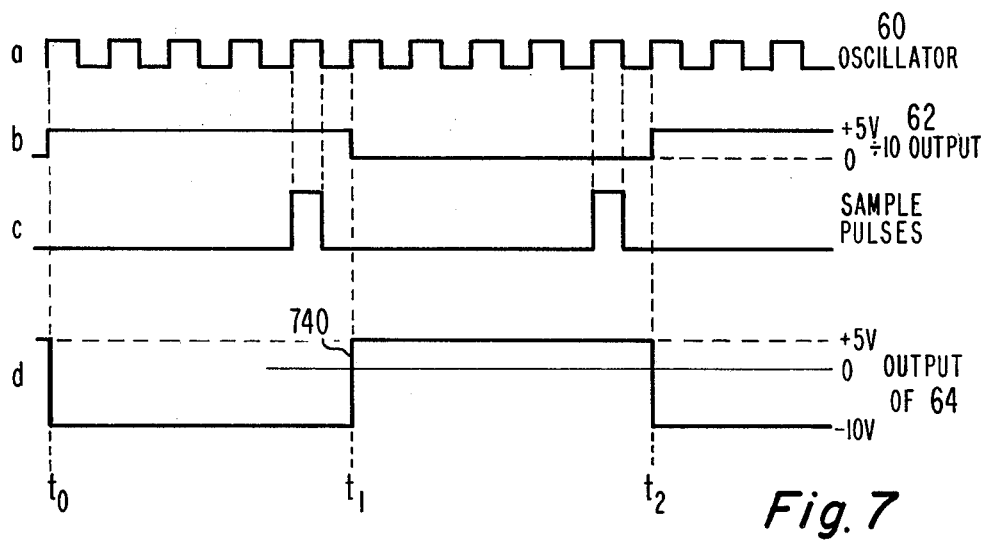
FIGS. 7–12 are voltage-time diagrams useful in explaining the operation of FIGS. 5 and 6.
Figure 8:
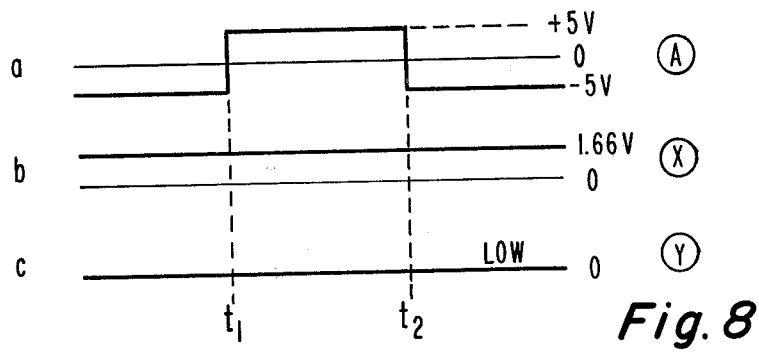
Figure 9:
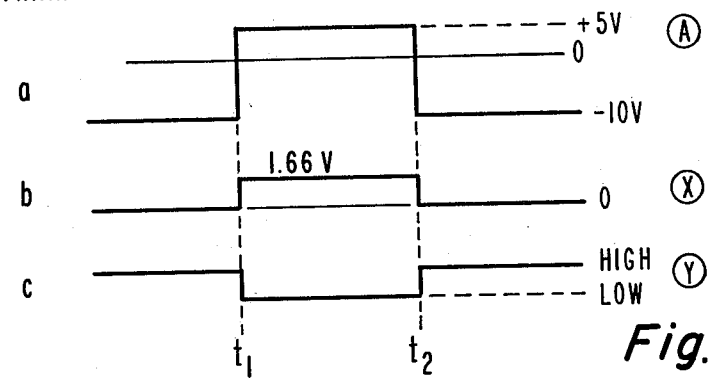

FIG. 6 shows details of safety circuit 44 which will be described in conjunction with FIGS. 7–12. Oscillator 60 provides a square wave signal as shown in FIG. 7(a) with a frequency of about 100 Hz. The signal is applied to divider-decoder 62 where it is divided by ten (see FIG. 7b). The divided signal, which has alternate polarities of +5 and 0 volts, is applied to inverting amplifier 64 and is sufficient to saturate amplifier 64. OR gate 66 has inputs coupled to the outputs of stages four and nine of divider 62 and provides the sampling pulses of FIG. 7(c) to switch 68. Amplifier 64 has coupled thereto output resistor R1 and bridging resistors R2 and R3. As shown in FIG. 7(d) the output signal 740 from amplifier 64 is a square wave alternating between +5 volts (before $t_0$ and between $t_1$ and $t_2$) and −10 volts (between $t_0$ and $t_1$ and after $t_2$). These two voltages are the voltages of the two power rails coupled to amplifier 64. Thus amplifier 64 is saturated in both states and said output signal is applied through resistor R1 to output point A. The signal at output A is applied by relay contacts S2 and inductor L1 (as shown in FIG. 5, neither shown in FIG. 6) to inner conductor 16. If triax 15 is connected, at CH 10 the signal is applied to combination 46, which comprises the series confirmation of resistor R4 and diode CR1. Because of diode CR1, combination 46 affects at point A only the negative portions of the signal 740 from amplifier 64. In particular, the negative portions are limited to −5 volts (before $t_1$ and after $t_2$), while the positive going portions are unaffected and remain at +5 volts (between $t_1$ and $t_2$), see FIG. 8(a). By suitable choice of resistors R1, R2, R3 and R4, the waveform at the junction of resistors R2 and R3 (labelled as point X) is +1.66 volts DC, when point A is either +5 or −5 volts, see FIG. 8(b). Point X is coupled to a window detector 70, and more particularly to the positive input of voltage comparator 72 and the negative input of voltage comparator 74. Comparators 72 and 74 have reference potentials of +1.8 and +1.5 volts applied to their negative and positive inputs respectively. Therefore, the outputs of comparators 72 and 74 will be high if the potential at point X is higher than +1.8 volts or lower than +1.5 volts respectively. OR gate 76 has inputs respectively coupled to the outputs of comparators 72 and 74 and supplies at its output Y a low level logic signal to switch 68 if the signal on X is between +1.5 and 1.8 volts.

A low (0 volts) signal from window detector 70 at output Y (see FIG. 8c) causes switch 68 to apply sample pulses from OR gate 66 to clock input C of divide-by-64 divider 78, while a high signal (+5 volts) from detector 70 causes the sample pulses to be applied to reset input S. If the signal at Y has been low for the time duration of 64 sample pulses, divider 78 provides an output signal to trigger one shot (monostable multivibrator) 80. One shot 80 in turn provides a 200 ms. (millisecond) pulse to coil 84 of relay RE1 through OR gate 82. This 200 ms. pulse is long enough to connect AC input 48 of FIG. 5 to triax 15, which switches over relay RE2 in CH 10 and therefore applies AC power to the power supply in CH 10. Since current is now flowing, current sensing coil 50 supplies a signal to relay coil 84 through gate 82, and therefore AC power will continue to be supplied even after the 200 ms. pulse ends, as explained above.

If the potential on X is outside the range of +1.5 to +1.8 volts, then a high signal is present at output Y and divider 64 is reset, and therefore no pulse is generated by one shot 80. Thus there will be no application of AC power to triax 15. It will be readily seen that if the voltage at point A is within a selected "window" (+1.5 to 1.8 volts) for a selected time (64 sample pulse periods) AC power is applied to triax 15.

FIGS. 9a, b, and c show the above-mentioned potentials at points A, X, and Y respectively when triax 15 is not connected (open circuited). Since diode CR1 is not connected to point A through the triax, the potential at point A before $t_1$ and after $t_2$ is −10 volts, i.e. the full negative output potential from amplifier 64 and is +5 volts between $t_1$ and $t_2$, see FIG. 9a. Point X is, therefore, +1.66 volts only when the potential at point A is +5 volts and 0 volts elsewhere, see FIG. 9b. Thus the potential at point Y is low during the interval between $t_1$ and $t_2$, see FIG. 9c, and since this interval is less than 64 sampling pulse periods, no AC power is applied to triax 15.

Figure 10:
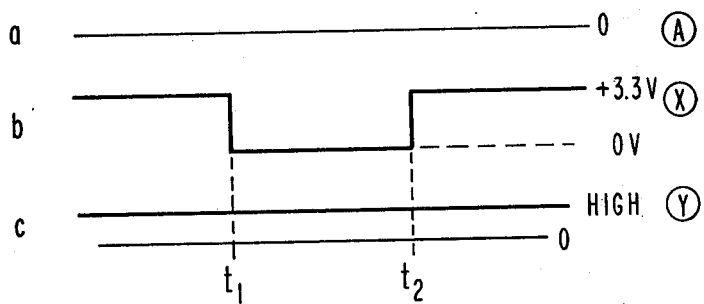

When the triax 15 is short circuited (inner conductor 16 connected to inner shield 20) the potential at point A is by definition always about 0 volts (exactly 0 volts if the resistance of triax 15 is disregarded), see FIG. 10a. When the output potential from amplifier 64 is +5 volts between $t_1$ and $t_2$, the potential at point X is 0 volts. When the output potential from amplifier 64 is −10 volts before $t_1$ and after $t_2$, the voltage at point X is +3.33 volts, see FIG. 10b. In either case, the potential at point X is outside of said window, and therefore the potential at point Y is always high, see FIG. 10c. As in the open-circuited case of FIG. 9, no AC power is applied to triax 15 for the short circuit case illustrated in FIG. 10.

Figure 11:
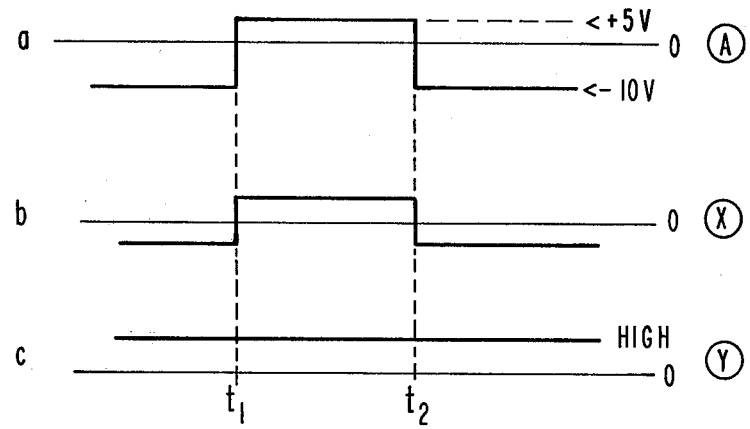

FIG. 11 shows waveforms for the case when the cable is touched by a human finger. The "finger resistance" may vary from several KΩ (wet) to several MΩ (dry). When the output potential from amplifier 64 is −10 volts before $t_1$ and after $t_2$, the potential at point A is something less negative than −10 volts, while when the amplifier 64 output potential is +5 volts between $t_1$ and $t_2$, the potential at point A is less than +5 volts, see FIG. 11a. The potential at point X in FIG. 11b is indeterminate, but will probably not be within the window for the required duration and therefore the potential at point Y will be continuously high, see FIG. 11c. Thus no AC power is applied to triax 15. Even when the potential from amplifier 64 is +5 volts between $t_1$ and $t_2$ the potential at point X is within the window due to a fortuitous finger resistance, the potential at point Y will be low for an insufficient length of time to activate the application of AC power, as was the case shown in FIG. 9 (triax 15 not connected). This is true since the $-10$ volts from amplifier 64 can never be made positive, and certainly not within said window, by any value of finger resistance from 0 to infinite ohms.

Figure 12:
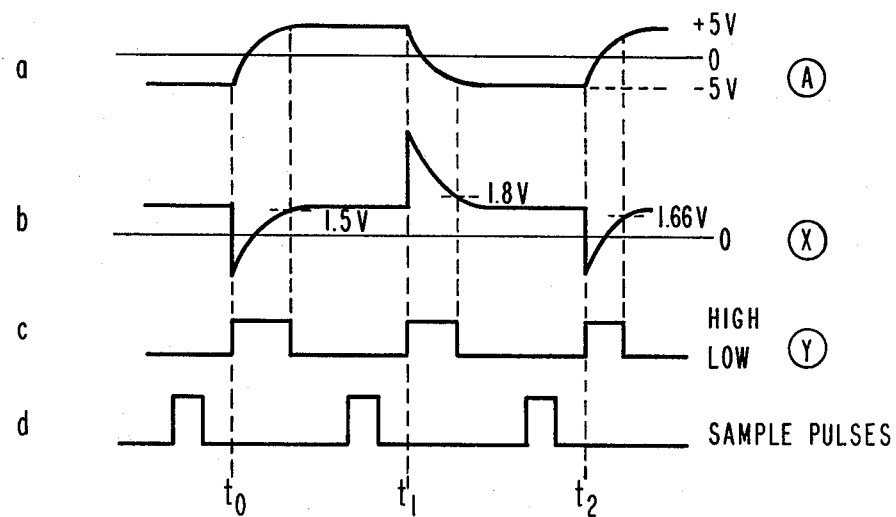

The waveforms of FIGS. 7-11 have been idealized. Practical waveforms are shown in FIG. 12 when triax cable 15 is connected. It can be seen in FIG. 12a that the edges of the pulses at point A are rounded. This is because of the inherent cable capacitance, which can become considerable for long cables and also is due to the resistor $R_1$. For this reason the sample pulses of FIG. 12d are delayed relative to the beginning of the pulses at point X (shown in FIG. 11b) at $t_0$, $t_1$, $t_2$, etc. so that sampling takes place during the straight horizontal portion of pulses X. Further the frequency of signal A should not be much higher than 10 Hz. The divider 78 inserts a delay of 3.2 seconds after the cable has been connected. Instead of using a resistor-diode for combination 46 similar or more complex combinations could be used, but then also the elements $R_1$, $R_2$, $R_3$ must be adapted.

Figure 13:
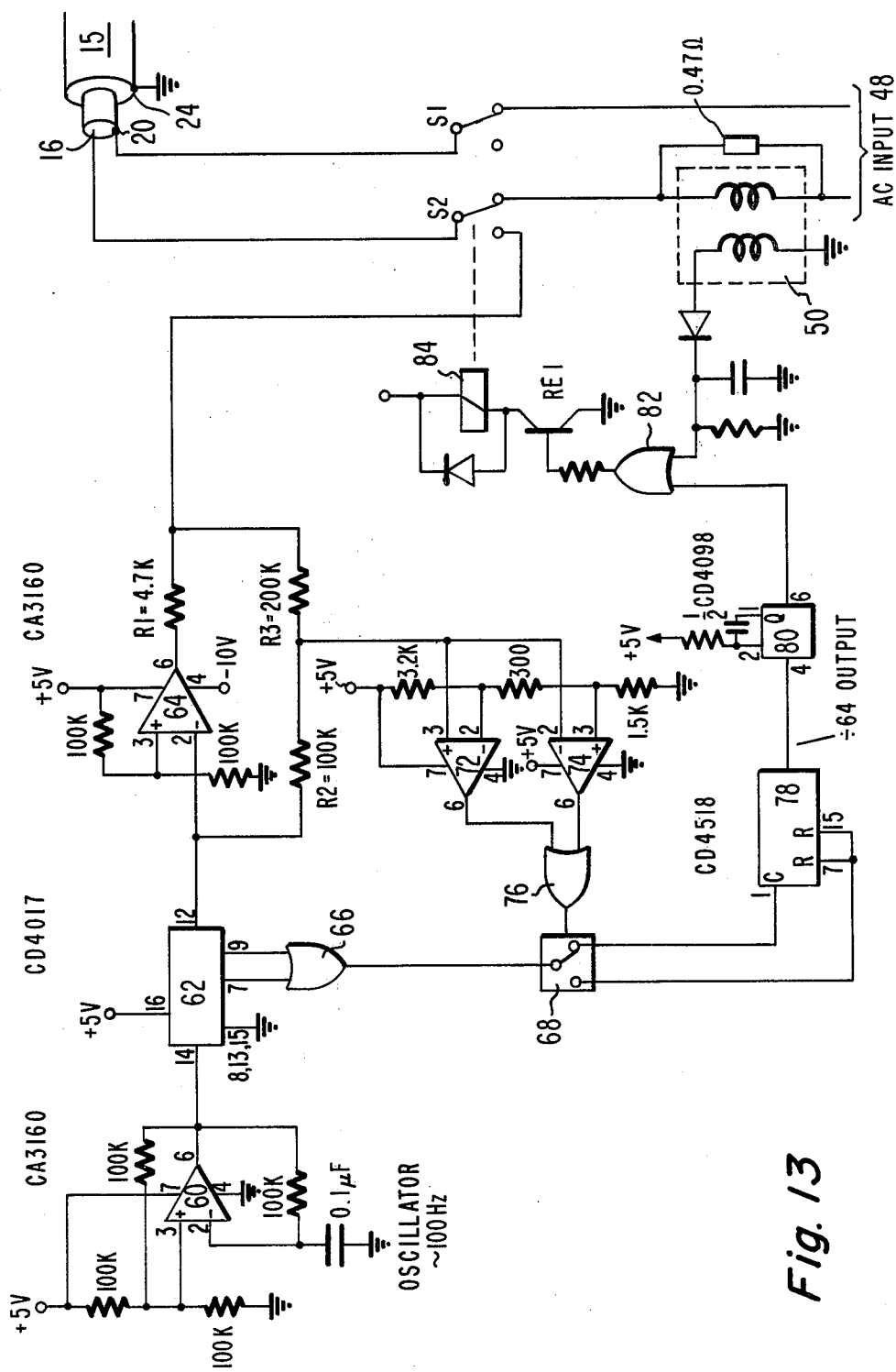
FIG. 13 is a detailed schematic of the invention.

The complete circuit is shown in FIG. 13 for the sake of completeness. Resistor R4 is 4700 ohms.

What is claimed is:

1. A method for applying power from a first unit through a transmission line to a second unit, said method comprising applying a current to said transmission line at said first unit, sensing if said current is interrupted, ceasing the application of said current to said line upon sensing that said current has been interrupted, applying a selected impedance to said line at said second unit, sensing said selected impedance at said first unit, and reapplying power to said line at said first unit upon sensing at said first unit said selected impedance.

2. A method as claimed in claim 1, wherein said selected impedance comprises a substantially unidirectional conducting means and said second recited sensing step comprises applying to said line a signal having different alternating polarities, deriving a signal in accordance with said applied signal and said conducting means, and detecting at said first unit the different effects said conducting means has upon said different polarities of said derived signal.

3. A method as claimed in claim 2, wherein said detecting step comprises determining if said derived signal is within a selected potential value for at least a selected time.

4. An apparatus comprising first and second units and a transmission line coupled therebetween, said first unit comprising means for applying a current to said transmission line, means for sensing if said current is interrupted and for ceasing the application of said current to said line upon sensing that said current has been interrupted; said second unit comprising means for applying a selected impedance to said line upon said interruption; and said first unit further comprising means for sensing said selected impedance, said applying means reapplying power to said line upon said sensing means sensing said selected impedance.

5. An apparatus as claimed in claim 4, wherein said selected impedance comprises a substantially unidirectional conducting means and said impedance sensing means includes means for applying to said line a signal having different alternating polarities, means for deriving a signal in accordance with said applied signal and said conducting means, and means for detecting the different effects said conductor means has upon said different polarities of said derived signal.

6. An apparatus as claimed in claim 5, wherein said detecting means comprises means for determining if said derived signal is within a selected potential value for at least a selected time.

7. An apparatus as claimed in claim 6, wherein said determining means comprises a pair of voltage comparators to determine if said derived signal is below and above upper and lower reference voltages respectively, an OR gate having a pair of inputs coupled to the outputs of said comparators; a switch having a control input coupled to the output of said OR gate, a signal input for receiving sampling pulses, and a pair of outputs; and a divider having clock and clear inputs coupled to said switch outputs respectively.

8. An apparatus as claimed in claim 5, wherein said unidirectional conducting means comprises a diode.

9. An apparatus as claimed in claim 5, wherein said applying means comprises a source of pulses and an amplifier coupled to a pair of power supplies having opposite polarities; said deriving means comprising an output resistor coupled to the amplifier output, and a pair of series coupled bridging resistors coupled between said amplifier input and output; and said detecting means comprises a voltage window detector coupled to said bridging resistors.

10. An apparatus as claimed in claim 4, wherein said first and second units comprise a television camera processing unit and a camera head respectively and said line comprises a triax cable.

11. An apparatus as claimed in claim 4, wherein said each of said applying means comprises a relay, and said interrupt sensing means comprises a current sensing coil.

* * * * *